(12) United States Patent
Wolcott et al.

(10) Patent No.: X4711
(45) Date of Patent: Mar. 19, 1827

(54) ALCOHOL, EXTRACTING BY STEAM

(76) Inventors: Anson Wolcott; Norman Wolcott

United States Patent Patent No.: X4711

Anson Wolcott and Norman Wolcott
Letters Patent

The Schedule referred to in these Letters Patent and making part of
the same containing a description in the words of the said Anson
Wolcott and Norman Wolcott themselves of their improvement in
extracting alcohol from common proof spirits by the use of Steam.

The principle we use for extracting alcohol from common proof
spirits is by enclosing a Still within a wood or metallic vessel
which Still contains . . . . the common proof spirits, and
likewise a worm or single tube which magenta the side of the
Still and extend to the bottom. The Steam is generated in the
common way and when let on it enters the worm or tube in the
Still. If the worm, it passes through its windings and through
the bottom of the Still into the space between the Still and vessel
which encloses it, but if the Steam enter the other tube it dis
charges within the Still. The Steam pipe which leads from the
Boiler extends down to the bottom of the vessel from which the
Steam is taken into the vessel which encloses the Still, render
ing thereby assistance to that which passes thro' the worm in
the Still, both of which set the spirits in the Still boiling
or either one of those pipes which discharge the Steam between
the Still and vessel, may answer the purpose alone. The spirits
as it leaves the Still, enters another Still, which is like the first
enclosed, and by the heat of the Steam or spirits from the first
Still, together with the Steam taken from the first vessel
which envelopes the Still both of which set the second Still boil
ing, or either one alone may do it. As the spirits leave this Still
it enters the Still worm and is drawn off at bottom.

The vessels enclosing the Stills, have vents to discharge
the surplus Steam and water. This principle may be used in
extracting Spirits of turpentine, refining Sugar, making varnish,
and is useful for dies of cloths, for planking and colouring Vats, and is applicable in many chemical operations where fire directly applied is dangerous. all of such operations your petitioners claim as their right.

Witnesses
Ezra L. Wilcox
Orson Benjamin
Geo. Deming

Anson Wolcott
Norman Wolcott (408 Words)

(Granted March 17. 1827)